United States Patent [19]

Suzuki et al.

[11] Patent Number: 5,481,752
[45] Date of Patent: Jan. 2, 1996

[54] METHOD OF EDITING MULTIMEDIA DATA INCLUDING GRAPHIC DISPLAY OF REPRODUCTION TIMES

[75] Inventors: Kisoko Suzuki, Neyagawa; Hidemasa Kitagawa, Toyonaka; Koichiro Endo, Osaka; Yoshihiro Mori, Hirakata, all of Japan

[73] Assignee: Matsushita Electric Industrial Co., Ltd., Osaka, Japan

[21] Appl. No.: 336,239

[22] Filed: Nov. 7, 1994

Related U.S. Application Data

[62] Division of Ser. No. 115,831, Sep. 3, 1993, Pat. No. 5,386,581, which is a continuation of Ser. No. 500,543, Mar. 28, 1990, abandoned.

[30] Foreign Application Priority Data

| Mar. 28, 1989 | [JP] | Japan | 1-77562 |
| Oct. 13, 1989 | [JP] | Japan | 1-266483 |

[51] Int. Cl.⁶ ............................... G06F 3/00
[52] U.S. Cl. ............ 395/800; 395/146; 395/140; 395/100; 364/419.17; 364/225.6; 364/225.8; 364/226; 364/DIG. 1; 360/19.1; 360/23
[58] Field of Search ............... 395/800, 500, 395/162, 147, 146, 140, 100, 425, 325, 155, 153; 369/14, 47, 63, 83, 86, 19-34; 368/69, 70, 71, 89, 223; 360/1, 12, 13, 22, 23, 24, 27, 36.1, 37.1, 57, 19.1; 358/335, 337, 343; 364/188-192, 419.07, 419.17, 419.19

[56] References Cited

U.S. PATENT DOCUMENTS

| 4,215,343 | 7/1980 | Ejiri et al. | 340/711 |
| 4,375,083 | 2/1983 | Maxemchuk | 364/900 |
| 4,476,543 | 10/1984 | Quinones et al. | 364/900 |
| 4,541,022 | 9/1985 | Katsuyama | 360/72.2 |
| 4,658,427 | 4/1987 | Aubin | 381/124 |
| 4,853,867 | 8/1989 | Matsumura | 364/474.22 |
| 4,953,153 | 8/1990 | Suzuki | 369/49 |
| 4,976,182 | 12/1990 | Obuchi et al. | 84/462 |
| 4,991,159 | 2/1991 | Tomoda et al. | 369/19 |
| 5,007,005 | 4/1991 | Hatakeyama et al. | 364/521 |
| 5,040,234 | 8/1991 | Yamamoto et al. | 388/811 |
| 5,043,826 | 8/1991 | Yoshio et al. | 358/335 |
| 5,197,051 | 3/1993 | Tomoda et al. | 369/14 |

FOREIGN PATENT DOCUMENTS

| 268270 | 5/1988 | European Pat. Off. . |
| 0291028 | 11/1988 | European Pat. Off. . |

OTHER PUBLICATIONS

Journal of the Society of Motion Picture Engineers, vol. 95, No. 5, May 1986, New York US, pp. 567–571; J. Borish et al., "SouthDroid: A New System For Electronic Post–Production of Sound".

IBM Technical Disclosure Bulletin, vol. 30, No. 10, Mar. 1988, New York, US, pp. 351–353; "Three–Level Audio Object Display For A Personal Computer Audio Editor".

Rundfuntechnische Mitteilungen, vol. 30, No. 6, Nov. 1986, Norderstedt De, pp. 281–287; A Schertz et al., "Ein Grafik–Display Furn Schnittsysteme".

*Primary Examiner*—Mehmet Geckil
*Assistant Examiner*—Alpesh M. Shah
*Attorney, Agent, or Firm*—Wenderoth, Lind & Ponack

[57] ABSTRACT

A data editing apparatus includes a mass storage device to edit multimedia data such as picture, audio, text and other data. By the visual graphic display of the time positions of the edited information, the user can easily grasp the reproduction time of the picture, text and audio data, thereby simplifying synchronization of plural media data. Graphic editing may be effected to facilitate multimedia data editing.

2 Claims, 5 Drawing Sheets

METHOD OF EDITING MULTIMEDIA DATA INCLUDING GRAPHIC DISPLAY OF REPRODUCTION TIMES

This is a Divisional of application Ser. No. 08/115,831, now U.S. Pat. No. 5,386,581 filed Sep. 3, 1993, which is a Continuation of application Ser. No. 07/500,543, filed Mar. 28, 1990, now abandoned.

BACKGROUND OF THE INVENTION

The present invention generally relates to a data editing apparatus which is adapted to effect a digital editing operation of information such as moving picture data, still picture data, audio data, text data and so on.

In recent years, the development of data editing apparatuses having mass data storage device has progressed to effect editing operations picture, audio and so on. Various applications for such editing of picture, audio and other information also developed.

Some conventional data editing apparatuses edit picture data, for example, through the inputting and, outputting operations of time codes as numeral values.

Figure 4:
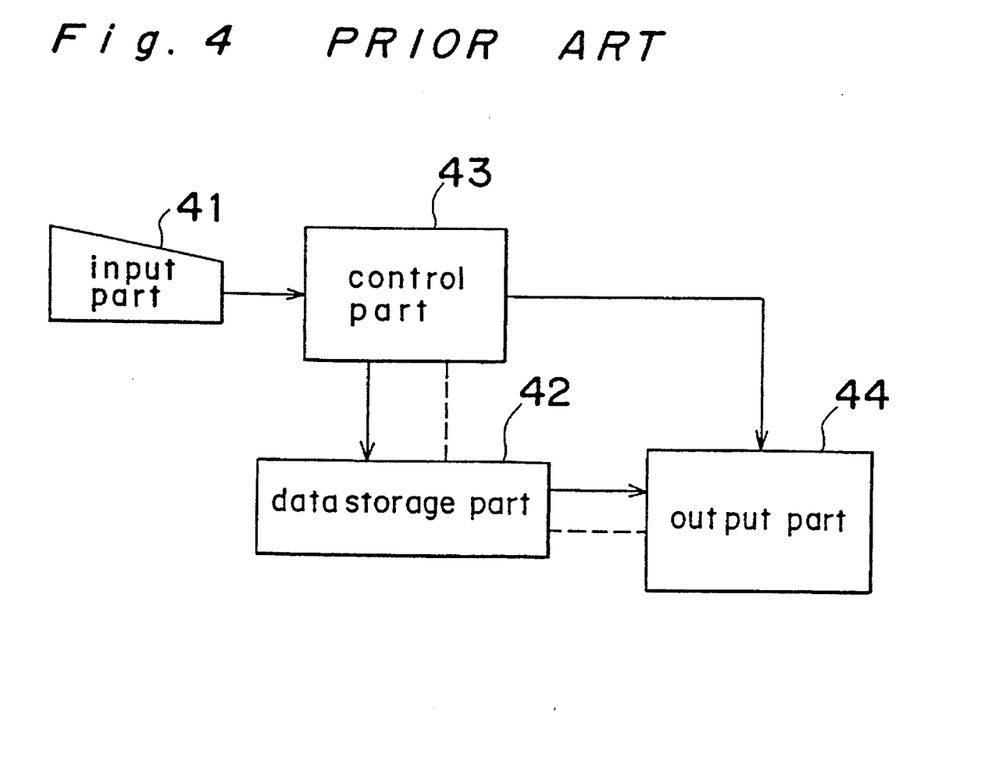
FIG. 4 is a block diagram showing the basic construction of the conventional data editing apparatus.

FIG. 4 is a block diagram showing the construction of the conventional data editing apparatus. In FIG. 4, reference numeral 41 is an input part, in which the user inputs instructions, reference numeral 42 is a data storage part for storing audio and picture data, reference numeral 43 is a control part for reading the picture and audio data from the data storage part 42 in accordance with the input signals from the input part 41, reference numeral 44 is an output part which is adapted to receive the picture data and the audio data from the data storage part 42 in accordance with the input signals from the input part 41, and to effect the display and audio outputting operations.

The operation of the conventional data editing apparatus constructed as hereinabove will now be described.

The file names of the outputting picture data and, audio data, and the output timings are inputted from the input part 41. The control part 43 reads the picture and, audio data from the data storage part 42 in accordance with the input data from the input part 41. The read data is fed into the output part 44 to effect a series of picture display and, audio output operations.

However in such a configuration as described hereinabove, the reproduction time of the picture and, auto data is handled using numeral values, thus making it difficult to correspond the time and the data, whereby a problem arises in that synchronization of the picture and audio media is difficult to effect.

SUMMARY OF THE INVENTION

Accordingly, the present invention has been developed with a view to substantially eliminating the above discussed drawbacks inherent in the prior art data editing methods and has for its essential object to provide an improved data editing method.

Another important object of the present invention is to provide an easier method for editing multimedia data of the type referred to above, comprising the steps of grasping the reproducing time of the picture, text and, audio data by the visual expression of the time positions of the information, thereby simplifying the synchronization of a plurality of media data, and making it possible to effect the graphic editing.

In accomplishing these and other objects, according to one preferred embodiment of the present invention, the data editing system of the present invention comprises a plurality of information storage parts for storing a plurality of material information and destination information with the material information being arranged in a time system; an input part for outputting, by the operations of a user, the construction information for specifying one material information from the plurality of material information so as to indicate the specific area of the specified material information, the arrangement information showing the arrangement condition in the destination information of the specific area of the material information indicated by the construction information, and the indication information showing a processing method of a time address value showing the address value of the information of the material information with the time being provided as a unit, the material information, and the destination information; a control part for selecting the material information from the plurality of information storage parts in accordance with the composition information outputted from the input part, arranging in the time system the material information selected in accordance with the arrangement information outputted from the input part so as to produce the destination information, storing them in the corresponding information storage part; a display control part for effecting a material information graphic display operation of picture-outputting the material information graphics having the area proportional to the information amount of the plurality of material information, a destination information graphic display operation of arranging in parallel the destination information graphics having the area proportional to the information amount of the plurality of destination information so as to effect the picture outputting operation, a first digital display operation of digitally displaying the time address value in the indication point on the material information graphic indicated in accordance with the indication information from the input part, and a second digital display operation of digitally displaying the time address value in the indicating point on the destination information graphics indicated in accordance with the indication information from the input part; and a synchronization control output part for synchronizing in time the plurality of destination information to be stored in the plurality of information storage part in accordance with the the respective arrangement information and the indication information from the input part.

In accordance with the above described construction, the present invention includes the display control part calculating the respective information amount in a plurality of stored material information and the information amount of the destination information so as to display, outputting the information graphics having the area proportional to the information amount, and in addition, expressing the information of the plurality of material information and destination information so as to allow the visual expression of the time positions of the information, and the user may easily grasp the reproduction time. By the use of the present invention, the synchronization of the picture, text and, audio data may be easily effected, the position to be partially reproduced may be easily specified, and the position to be edited may be easily specified. Further, by the use of the marker, it is possible to visually store the time address value, to simplify the positional specification of the information, and to easily effect the editing operation, thus resulting in extremely advantageous practical effects.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

In the present embodiment, the present invention is applied to a data editing apparatus and a method constructed with a work station having a mass storage memory for storing the digital information. An application which makes a video presentation of a dress and its accessories will be described by way of an example.

Figure 1:
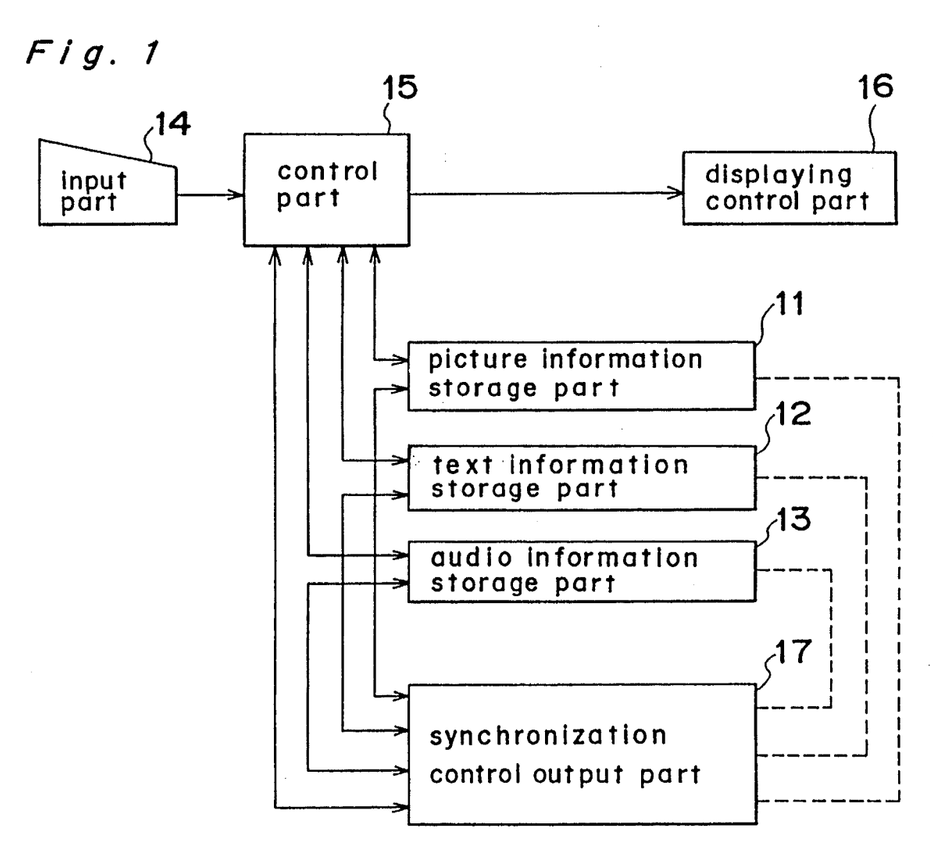
FIG. 1 is a block diagram showing the construction of a data editing apparatus in one embodiment of the present invention.

Referring now to the drawings, there is shown in FIG. 1, a block diagram of a data editing apparatus according to one preferred embodiment of the present invention, which includes a picture information storage part 11 for storing in the mass storage apparatus a plurality of material picture information and destination picture information with the plurality of material picture information being arranged in a time system, a text information storage part 12 for storing on the mass storage apparatus a plurality of material text information and destination text information with the plurality of material text information being arranged in a time system, an audio information storage part 13 for storing in the mass storage apparatus a plurality of material audio information and destination audio information with the plurality of material audio information being arranged in a time system, an input part 14 for outputting, in response to the operations of the user, construction information for specifying one material information from the plurality of material information so as to indicate the specific area of the specified material information, arrangement information showing the arrangement condition in the destination information of the specific area of the material information indicated by the construction information, and indication information showing a method of processing the time address value showing the address value of the information of the material information with the time as a unit, the material information and the destination information; a control part 15 for selecting the material information from the respective information storage parts 11, 12, 13 in accordance with the construction information outputted from the input part 14, and arranging in the time system the material information selected in accordance with the arrangement information outputted from the input part 14 to produce the destination information so as to store it into the corresponding information storage parts 11, 12, 13, a display control part 16 for effecting a material information graphics dis- playing operation of picture-outputting the material information graphics having the area proportional to the information amount of the plurality of material information, a destination information graphics displaying operation of arranging in parallel the destination information graphics having the area proportional to the information amount of the plurality of destination information so as to effect the picture outputting operation, a first digital display operation of digitally displaying the time address value in the indication point on the material information graphics indicated in accordance with the indication information from the input part 14, and a second digital display operation of digitally displaying the time address value in the indication time on the destination information graphics indicated in accordance with the indication information from the input part 14, and a synchronization control output part 17 for effecting the time synchronization of the plurality of destination information stored in the plurality of information storage parts 11, 12, 13 in accordance with the respective arrangement information and the indication information from the input part 14 so as to effect the reproducing operation.

Specifically, the material picture information to be stored in the picture information storage part 11 is approximately one minute moving pictures for introducing dresses of certain design. The destination picture information is a united dress catalog picture information with the short-time moving pictures of various types of design dresses being combined in it. The material text information to be stored in the text information storage part 12 is a text catalog for illustrating the materials, sizes, colors and so on of dresses of a certain design. The destination text information is the united dress catalog text information combined so that the text catalog of design dresses of the various types may become a story. The material audio information to be stored in the audio information storage part 13 is approximately one minute music. The destination audio information is a united dress catalog audio information with the various type of short-time music being combined in it.

Figure 5:
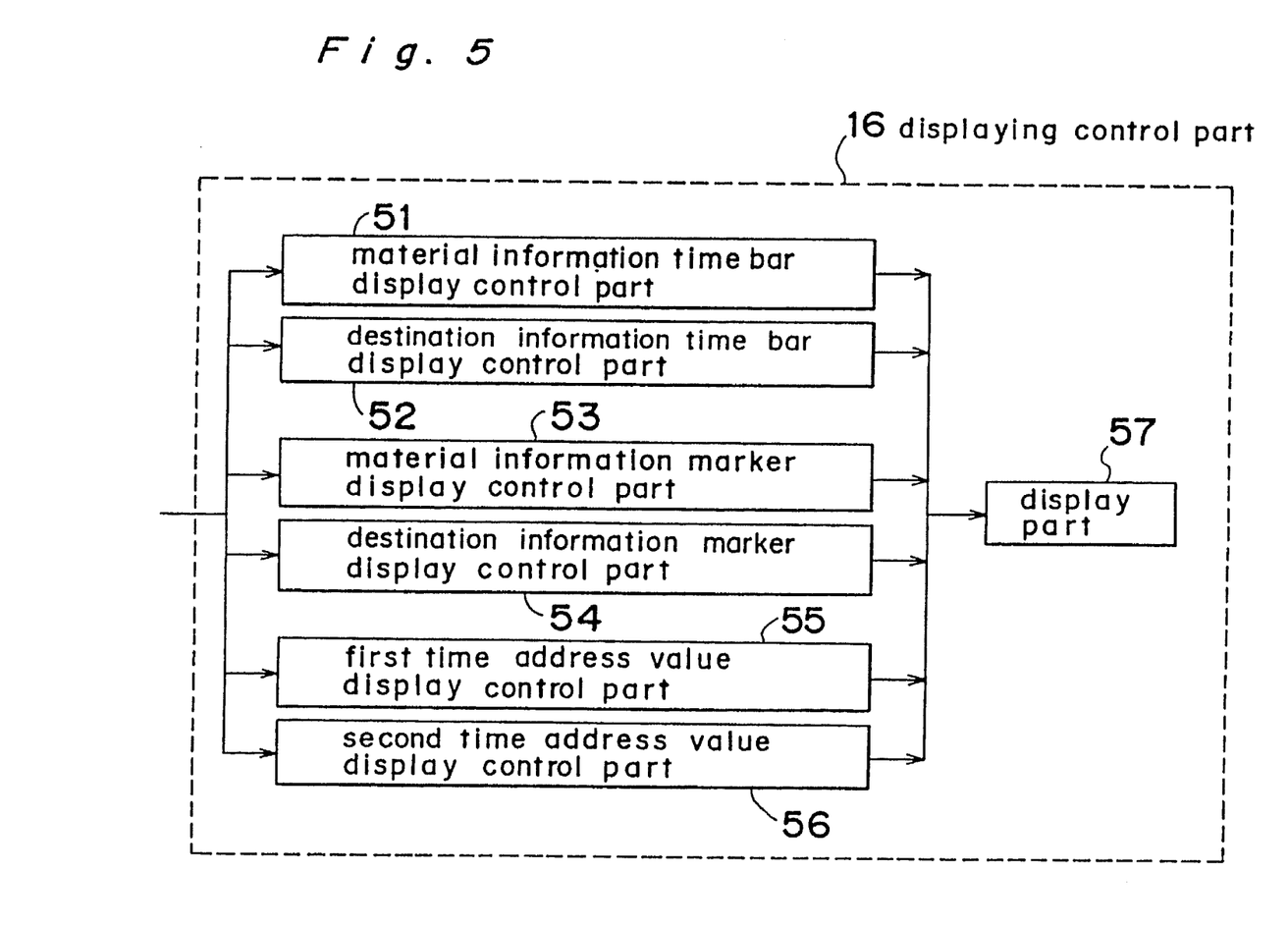
FIG. 5 is a block diagram showing the construction of the display control part 16 of FIG. 1.

FIG. 5 is a block diagram showing the construction of the display control part 16 of FIG. 1 of the present embodiment. In FIG. 5, reference numeral 51 is a material information time bar display control part for effecting the material information graphics display operation of picture-outputting the material information graphics having area proportional to the information amount of the plurality of material information, reference numeral 52 is a destination information time bar display control part for effecting the destination information graphics display operation of arranging in parallel the destination information graphics having the area proportional to the information amount of plurality of destination information so as to effect the picture outputting operation, reference numeral 53 is a material information marker display control part for repeatedly displaying the graphics showing the time address value on material information graphics, reference numeral 54 is a destination information marker display control part for effecting an operation of repeatedly displaying the graphics showing time address value on the destination information graphics, reference numeral 55 is a first time address value display control part for effecting a first digital display operation of digitally displaying the time address value in the indication point on the material information graphics indicated in accordance with indication information from the input part 14, reference numeral 56 is a second time address value display control part for effecting a second digital display operation of digitally displaying the time address value in the indication point on the destination information graphics indicated in accordance with the indication information from an input part 14, and reference numeral 57 is a display part for displaying on one picture face what is produced by each of the display control operation parts. The display control part 16 is composed of the material information time bar display control part 51, the destination information time bar display control part 52, the material information marker display control part, the destination information marker display control part, the first time address display control part, the second time address display control part, and the display part.

The data editing apparatus constructed as described hereinabove will be described hereinafter in its operation with the use of FIG. 1, FIG. 2 and, FIG. 3.

Figure 2:
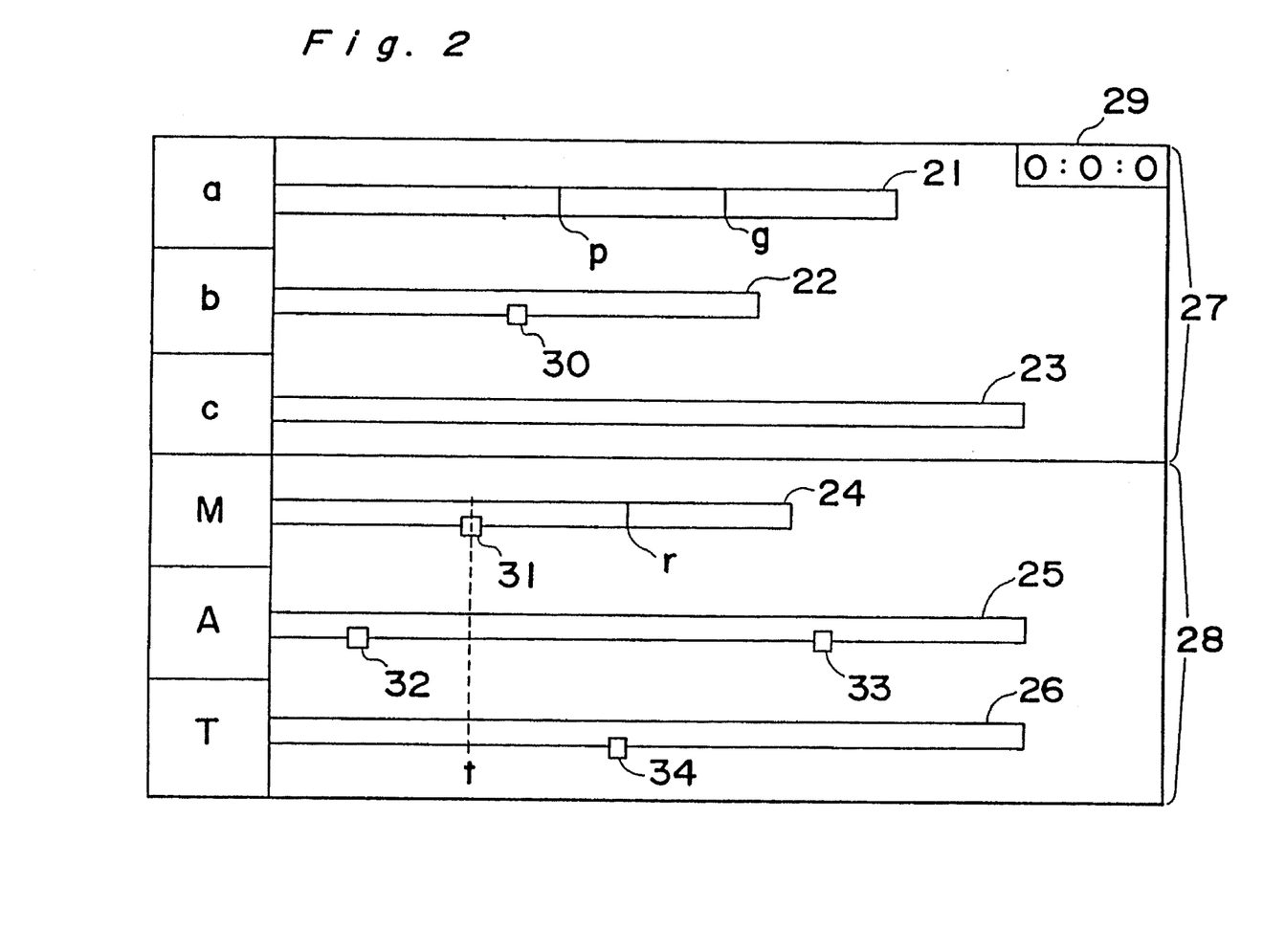
FIG. 2, and FIG. 3 are charts each showing the picture face construction of the editing picture face of the data editing apparatus of the present invention.

FIG. 2 is a graph showing the picture face construction of the edition picture face displayed on the display control part 16. The reference numerals 21, 22, 23 in FIG. 2 are the material information time bars with the information amount of the material information being converted into the area, reference numerals 24, 25, 26 are the destination information time bars having the area proportional to the information amount of the destination information, reference numeral 27 is the material information display portion with the material information time bars 21, 22, 23 being display on it, reference numeral 28 is the destination information display portion with the destination information time bars 24, 25, 26 being displayed on it, reference numeral 29 is a time display portion for digitally displaying the time address value of the information among the indication information, reference numerals 30, 31, 32, 33, 34 are markers for displaying the optional time address value on the time bar, reference character a is a first material information, reference character b is a second material information, reference character c is a third material information, reference character M is the destination information of the picture, reference character A is the destination information of the audio, reference character T is the destination information of the text. The time bars are represented with such bars as shown in the drawing. The reproduction time is calculated from the information amount of the material information and the destination information, and the transfer speed thereof so as to convert them into the lengths. Therefore, the lengths are proportional to the reproduction time. Here, the material information of the a, b, c is read, displayed from the picture information storage part 11 with the plurality of picture material information being stored therein.

Figure 3:
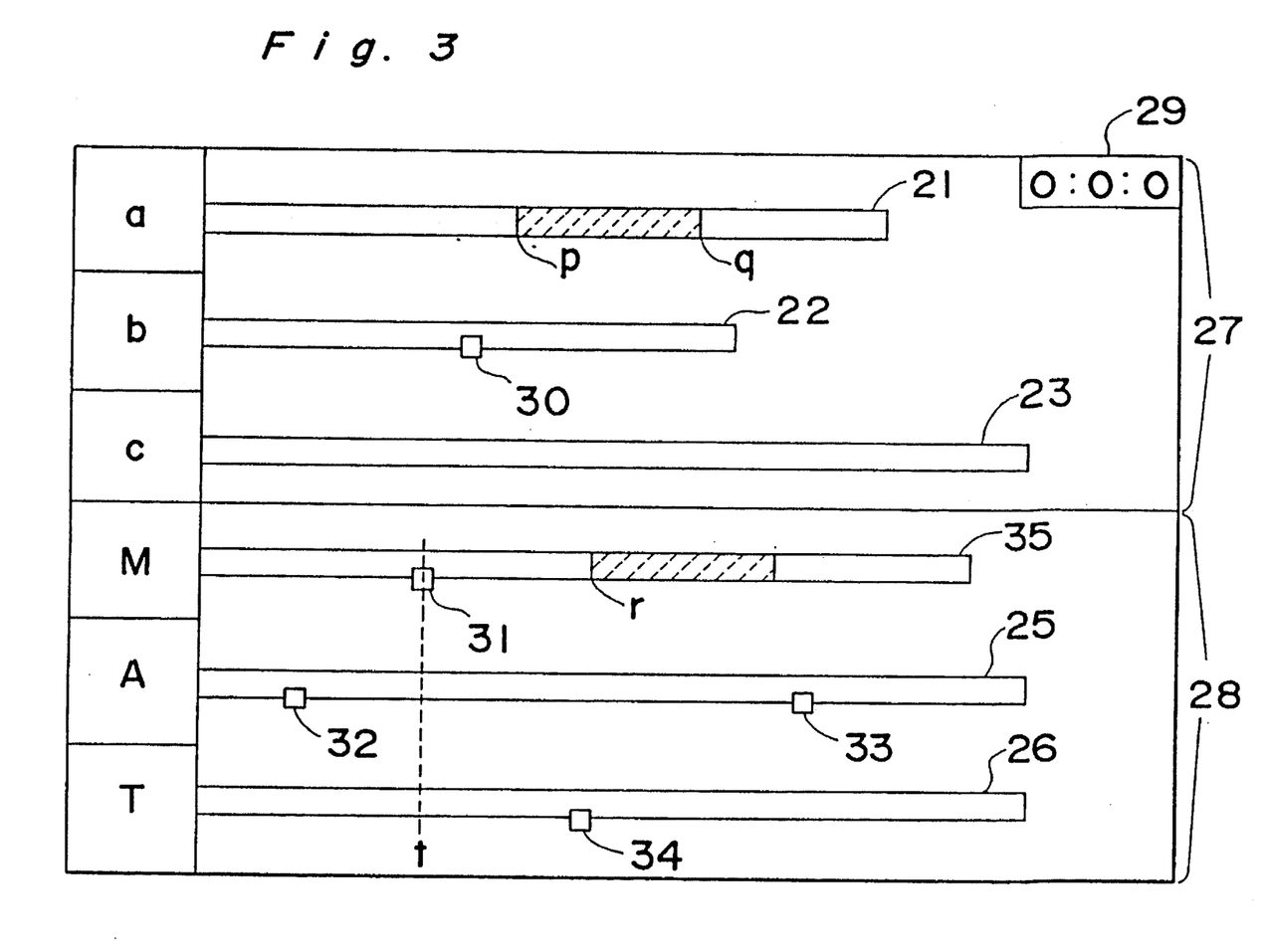

FIG. 3 is a graph showing the picture face construction of the edition picture face after the insertion edition to be displayed on the display control part 16. FIG. 3, reference numerals 21, 22, 23 are the material information time bars, reference numerals 35, 25, 26 are the destination information time bars. Reference numeral 35 is a time bar after the edition of the time bar 24 of FIG. 2. Reference numeral 27 is the material information display portion displaying the material information time bars 21, 22, 23, reference numeral 28 is the destination information display portion displaying the destination information time bars 24, 25, 26, reference numeral 29 is a time display portion for digitally displaying the time address value among the indication information. Reference numerals 30, 31, 32, 33, 34 are markers, reference character a is a first material information, reference character b is a second material information, reference character c is a third material information, reference character M is the destination information of the picture, reference character A is the destination information of the audio, and reference character T is the destination information of the text.

When an optional point p on the time bar or an optional marker 33 on the time bar is specified with the use of a mouse of the input part 14, the indication information of the point p of the material information a or of the marker 33 of the destination information A is fed into the control part 15 from the input part 14. The control part 15 calculates the time address value from the coordinates of the point p or the marker 33. The display control part 16 receives the point information thereof so as to effect the first digital display operation or the second digital display operation for digitally displaying it on the time display portion 29. At the same time, the optional information corresponding to the point p, the marker 33 is called from the information storage part so as to reproduce it by the synchronization control part 17. By the specification of the optional point on the time bar like this, the display of the time address value and the reproduction of the data are effected. The markers 30, 31, 32, 33, 34 are marks for storing the points on the time bars. When the accessing is effected onto the same point on the time bar with the mouse, keep the marker marking on the point previously, and the same point is to be specified simply by the choice of the marker.

In the editing operation, in order to insert the information corresponding to between the p–q of the material information a into the position of the information corresponding to the point r of the picture information M, the optional point p and the optional point q on the time bar of the material information a are specified by the use of the mouse of the input part 14 to specify the optional point r on the time bar of the destination information A. The construction information of fetching the information between the p–q of the material information a from the input part 14 to the control part 15 and the arrangement information of inserting the fetched information into the position of the point r of the picture information M are fed to the control part. The control part calls the portion of the material information corresponding to between the p–q of the a from the picture information storage part 11 to build-in the material information in the optional position of the destination information corresponding to the point r so as to produce the new destination information M for storing the destination information M in the picture information storage part 11. At the same time, the portion which has the length proportional to the reproduction time of the new destination information M, and is newly built in displays the time bar the same in color as the original material by the display control part 17.

The same things can be said even about the other edition operations such as copying, deleting, and so on.

Also, in the above-description, the editing operation of the picture information has been described. The same things can be said even about the audio and the text.

When the optional coordinate t is specified with the mouth in the abscissas axis direction in the synchronizing, reproducing operations, the control part reads the respective destination information corresponding to the point t from the picture information storage part, the text information storage part, the audio information storage part in accordance with the indication information of effecting the synchronizing, reproducing operations from the position of the coordinate t from the input part so as to effect the reproducing operation at the same time by the synchronization control output part.

In the present embodiment, the mass storage apparatus is adapted to be digitally stored. However, the mass storage apparatus for storing the information is not restricted to it. For example, a capacity storage apparatus for storing analog data may obtain, also, the same effects.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A method of editing multimedia data comprising the steps of (1) visually representing reproduction times of information data, (2) confirming a designation location of the information data, (3) inserting the designated location of the information data, (4) deleting the designated location of the information data, and (5) confirming edition of the information data;

wherein said step (1) of visually representing reproduction times of information data includes the steps of (a) calculating a reproduction time of each of a plurality of material information data stored in a data storage portion and a reproduction time destination information data corresponding to said material information data, and (b) displaying graphics arranged in parallel, using a display control portion, said graphics having respective areas proportional to the calculated respective reproduction times so as to visually represent the respective reproduction times indicative of said material information data and indicative of the corresponding destination information data;

wherein said step (2) of confirming the designated location of the data includes the steps of (a) designating an optional location of the graphics, using an input portion, said graphics corresponding to the plurality of material information data or the plurality of destination information data being displayed by said display control portion, where indication information data corresponding to the designated location including identification data for distinction of the designation information part on the designated location, address value of the designated location and indication of indicating reproduction of the designation information part on the designated location are transmitted to a control portion, (b) converting the address value included in the indication information data into a time address value represented in a unit of time basis in said control portion, which the time address value is transmitted to said display control portion, (c) digitally displaying the time address value using said display control portion, and (d) simultaneously reading, in said control portion, the information data of a predetermined data amount corresponding to the time address value of the corresponding plurality of material information data or the destination information data, from a data storage portion in accordance with the identification data for distinction included in the indication information data, which the read-out information data is transmitted to a synchronization control portion where the resultant information data is reproduced, thereby confirming the designated location of the information data;

wherein said step (3) of inserting the designated information data includes the steps of (a) designating an optional range of the graphics corresponding to the plurality of material information data and an optional location of the graphics corresponding to the destination information data which corresponds to the plurality of material information data being displayed by said display control portion, thereby supplying, to said control portion, a construction information indicative of the identification data for distinction and the address value within the designated range of the designated material information data and arrangement information including the identification data for distinction of the designated destination information part, address value of the designated location thereof and insertion indication of inserting the destination information data part into the designated location, (b) reading, using said control portion, the designated range of the designated material information part from said data storage portion based on the construction information, (c) inserting the read-out designation range of the designated material information part into the designated location of the designated destination information part in said data storage portion, and (d) simultaneously displaying graphics, using said display control portion, said graphics having their areas corresponding to the increased amount of the information part due to the insertion of the designated destination information part, thereby effecting the insertion of the information data;

wherein said step (4) of deleting the designated location of the information data includes the steps of (a) designating an optional range of the graphics, using the input portion, said graphics corresponding to the plurality of material information data or the plurality of destination information data being displayed by said display control portion, thereby transmitting to said control portion the arrangement information including the identification information for distinction of the designated information part, address value of the designated location and deletion indication of deleting the data part of the designated range, (b) deleting the designated range of the designation information part in said data storage portion on the basis of the construction information, and (c) simultaneously displaying graphics, in said display control portion, said graphics having their areas corresponding to the decreased data amount due to the deletion of the designated destination information part, thereby executing the deletion of the information data; and wherein said step (5) of data edition confirming step includes the steps of (a) designating a location, using the input portion, said location corresponding to any same time address value of the graphics corresponding to the plurality of destination information data being displayed by said display control portion, whereby the address value of the designated location of the designated plurality of destination information data and indication information including indication of reproducing in synchronization the designated plurality of destination information data from the designated location are transmitted to said control portion, (b) converting the address value, using said control portion, said address value included in the designated designation information into the time address value corresponding to the designation location of the designated destination information part on the basis of the indication information, and (c) reading the respective information data contained in the designation location corresponding to the respective time address value corresponding to the designated designation information part from said data storage portion, which the read-out information is transmitted to said synchronization control portion where the respective information data are reproduced in synchronization, thereby executing the confirmation of editing data.

2. A method of editing multimedia data comprising the steps of (1) visually representing reproduction times of information data, (2) visually displaying the designated location of said plurality of material and destination information, (3) confirming a designated location of the information data, (4) inserting the designated location of the information data, (5) deleting the designated location of the information data, and (6) confirming edition of the information data;

wherein said step (1) of visually representing reproduction times of information data further includes the steps of (a) calculating a reproduction time of each of a plurality of material information data stored in a data storage portion and a reproduction time of each of a plurality of destination information data corresponding to said material information data, and (b) displaying graphics arranged in parallel, using a display control portion, said graphics having their areas proportional to the calculated respective reproduction times, so as to visually represent the respective reproduction times indicative of the material information data and indicative of the corresponding destination information data;

wherein said step (2) of visually displaying the designated location of said plurality of material and destination information data includes the step of displaying a plurality of markers, using said display control portion, said markers indicative of a predetermined time address value in superposition on a location according to the time address value corresponding to said markers of the graphics representing said plurality of material and destination information data, thereby visually displaying the designated location of the plurality of material and destination information data;

wherein said step (3) of confirming the designated data location includes the steps of (a) designating an optional location of the graphics, using an input portion, said graphics corresponding to the plurality of material information data or the plurality of destination information data being displayed by said display control portion, or designating the markers being displayed in superposition on the graphics corresponding to the plurality of material or destination information data, where indication information data corresponding to the designated location including identification data for distinction of the designation information part on the designated location, address value of the designated location and indication of indicating reproduction of the designation information part on the designated location are transmitted to a control portion, (b) converting the address value included in the indication information data into a time address value represented in a unit of time basis using said control portion, said address value, which the time address value is transmitted to said display control portion, (c) digitally displaying the time address value using said display control portion, and (d) simultaneously reading-out the information data of a predetermined data amount, using said control portion, said information data of a predetermined data amount corresponding to the time address value of the corresponding plurality of material information data or the destination information data, from a data storage portion in accordance with the identification data for distinction included in the indication information data, which the read-out information data is transmitted to a synchronization control portion where the resultant information data is reproduced, thereby confirming the designated location of the information data;

wherein said step (4) of inserting the designated information data includes the steps of (a) designating an optional range of the plurality of material information data by directly designating the graphics corresponding to the plurality of material information data being displayed by said display control portion or by designating the markers displayed in superposition on the graphics corresponding to the plurality of material information data, and designating an optional location of the destination information data by directly designating the graphics corresponding to the destination information data which corresponds to the plurality of material information data or by designating the markers displayed in superposition on the graphics corresponding to the destination information data, thereby supplying, to said control portion, construction information indicative of the identification data for distinction and the address value within the designated range of the designated material information data and arrangement information including the identification data for distinction of the designated destination information part, address value of the designated location thereof and insertion indication of inserting the destination information data part into the designated location, (b) reading-out the designated range of the designated material information part, using said control portion, from said data storage portion based on the construction information, (c) inserting the read-out designation range of the designated material information part into the designated location of the designated destination information part in said data storage portion, and (d) simultaneously displaying graphics, using said display control portion, said graphics having their areas corresponding to the increased amount of the information part due to the insertion of the designated destination information part, thereby executing the insertion of the information data;

wherein said step (5) of deleting the designated location of the information data includes the steps of (a) designating an optional range of the plurality of material or destination information data by directly designating the graphics corresponding to the plurality of material information data or the plurality of destination information data being displayed by said display control portion or by designating the markers displayed in superposition on the graphics corresponding to said plurality of material or destination information data, using the input portion, thereby transmitting to said control portion the arrangement information including the identification information for distinction of the designated information part, address value of the designated location and deletion indication of deleting the data part of the designated range, (b) deleting the designated range of the designation information part in said data storage portion on the basis of the construction information, and (c) simultaneously displaying graphics, in said display control portion, said graphics having their areas corresponding to the decreased data amount due to the deletion of the designated destination information part, thereby effecting the deletion of the information data; and wherein said step (6) of confirmation edition of the information data includes the steps of (a) designating a location, using the input portion, said location corresponding to any same time address value of the graphics corresponding to the plurality of destination information data being displayed by said display control portion or designating one of the plurality of markers displayed in superposition on the graphics corresponding to the plurality of destination information data, whereby the address value of the designated location of the designated plurality of destination information data and indication information including indication of reproducing in synchronization the designated plurality of destination information data from the designated location are transmitted to said control portion, (b) converting the address value included in the designated designation information into a time address value corresponding to the designation location of the designated destination information part on the basis of the indication information using said control portion, and (c) reading out the respective information data contained in the designation location corresponding to the respective time address value corresponding to the designated designation information part from said data storage portion, which the read-out information is transmitted to said synchronization control portion where the respective information data are reproduced in synchronization, thereby executing the confirmation of editing data.

* * * * *